(12) United States Patent
Kumar et al.

(10) Patent No.: US 9,302,709 B1
(45) Date of Patent: Apr. 5, 2016

(54) LIGHTWEIGHT MODULAR STRUCTURAL PANEL

(71) Applicant: NEW ENGLAND WHEELS, INC., Billerica, MA (US)

(72) Inventors: Anjani Kumar, Nashua, NH (US); Miteshkumar Hasmukhlal Patel, Nashua, NH (US); Paul LaRose, Mansfield, MA (US)

(73) Assignee: NEW ENGLAND WHEELS, INC., Billerica, MA (US)

( * ) Notice: Subject to any disclaimer, the term of this patent is extended or adjusted under 35 U.S.C. 154(b) by 0 days.

(21) Appl. No.: 14/739,569

(22) Filed: Jun. 15, 2015

(51) Int. Cl.
| | |
|---|---|
| *B32B 1/04* | (2006.01) |
| *B32B 3/02* | (2006.01) |
| *B62D 25/02* | (2006.01) |
| *B62D 29/04* | (2006.01) |
| *B32B 5/18* | (2006.01) |
| *B32B 7/12* | (2006.01) |
| *B32B 27/06* | (2006.01) |
| *B32B 27/36* | (2006.01) |
| *E04B 2/02* | (2006.01) |
| *E04C 2/34* | (2006.01) |
| *E04C 2/06* | (2006.01) |
| *E04C 2/20* | (2006.01) |

(52) U.S. Cl.
CPC . *B62D 25/02* (2013.01); *B32B 5/18* (2013.01); *B32B 7/12* (2013.01); *B32B 27/065* (2013.01); *B32B 27/36* (2013.01); *B62D 29/043* (2013.01); *B32B 2262/101* (2013.01); *B32B 2266/0214* (2013.01); *B32B 2266/045* (2013.01); *B32B 2605/08* (2013.01); *E04B 2002/028* (2013.01); *E04B 2002/0276* (2013.01); *E04B 2002/0282* (2013.01); *E04C 2/06* (2013.01); *E04C 2/205* (2013.01); *E04C 2/3405* (2013.01); *Y10T 428/23* (2015.01); *Y10T 428/233* (2015.01); *Y10T 428/237* (2015.01)

(58) Field of Classification Search
CPC ..... E04B 1/14; E04B 2/00; E04B 2002/0273; E04B 2002/0276; E04B 2002/028; E04B 2002/0293; E04B 2002/0282; E04C 2/3405; E04C 2/06; E04C 2/205; E04C 2/386; E04C 2/284; Y10T 428/233; Y10T 428/23; Y10T 428/237
USPC .......... 52/794.1, 405.3, 270, 284, 407.5, 52/309.11, 309.14, 309.15, 309.5, 309.4, 52/268, 269, 483.1, 309.9; 156/79, 307.7, 156/68; 428/71, 6, 411.1
See application file for complete search history.

(56) References Cited

U.S. PATENT DOCUMENTS

| | | | | |
|---|---|---|---|---|
| 3,697,633 A | * | 10/1972 | Edgar | B29C 44/1271 156/245 |
| 3,786,609 A | * | 1/1974 | Difazio | E06B 3/825 52/309.5 |
| 4,259,028 A | * | 3/1981 | Cook | E02D 17/08 156/79 |
| 5,285,608 A | * | 2/1994 | Costello | E06B 3/7001 52/309.11 |

(Continued)

*Primary Examiner* — Chi Q Nguyen
(74) *Attorney, Agent, or Firm* — Seyfarth Shaw LLP; Brian Michaelis; Christopher Baxter

(57) ABSTRACT

A panel construction including one or more pultruded box beams disposed between first and second outer sheets at selected locations. A core or filler material may also be disposed between the first and second outer sheets at selected locations. For example, the core material may be disposed between the first and second outer sheets and fill in the space between the box beams. In another example, the core material may include channels or recesses and the box beams may be positioned in the channels or recesses in the core material.

20 Claims, 13 Drawing Sheets

(56) References Cited

U.S. PATENT DOCUMENTS

| | | | | |
|---|---|---|---|---|
| 5,483,778 A * | 1/1996 | Scrivener | ............... | E04C 2/384 52/579 |
| 6,401,414 B1 * | 6/2002 | Steel | ............... | B32B 38/06 52/309.6 |
| 6,824,851 B1 * | 11/2004 | Locher | ............... | B29C 70/086 156/250 |
| 7,343,715 B2 * | 3/2008 | Ito | ............... | E01F 8/0017 428/120 |
| 7,897,235 B1 * | 3/2011 | Locher | ............... | B60R 13/08 428/71 |
| 8,590,265 B2 * | 11/2013 | Albertelli | ............... | B32B 37/02 52/309.14 |
| 8,733,066 B2 * | 5/2014 | Carlson | ............... | F25D 23/028 52/309.14 |
| 2004/0177581 A1 * | 9/2004 | Starke | ............... | E04C 2/521 52/481.1 |
| 2005/0055973 A1 * | 3/2005 | Hagen, Jr. | ............... | E04B 1/7604 52/741.1 |
| 2005/0188649 A1 * | 9/2005 | Hagen | ............... | B29C 44/186 52/782.1 |
| 2007/0193169 A1 * | 8/2007 | Emblin | ............... | E04B 1/161 52/426 |
| 2009/0113820 A1 * | 5/2009 | Deans | ............... | E04B 1/08 52/169.14 |
| 2011/0131921 A1 * | 6/2011 | Chen | ............... | E06B 5/161 52/784.1 |
| 2012/0124927 A1 * | 5/2012 | Hastings | ............... | E04C 2/22 52/309.6 |

\* cited by examiner

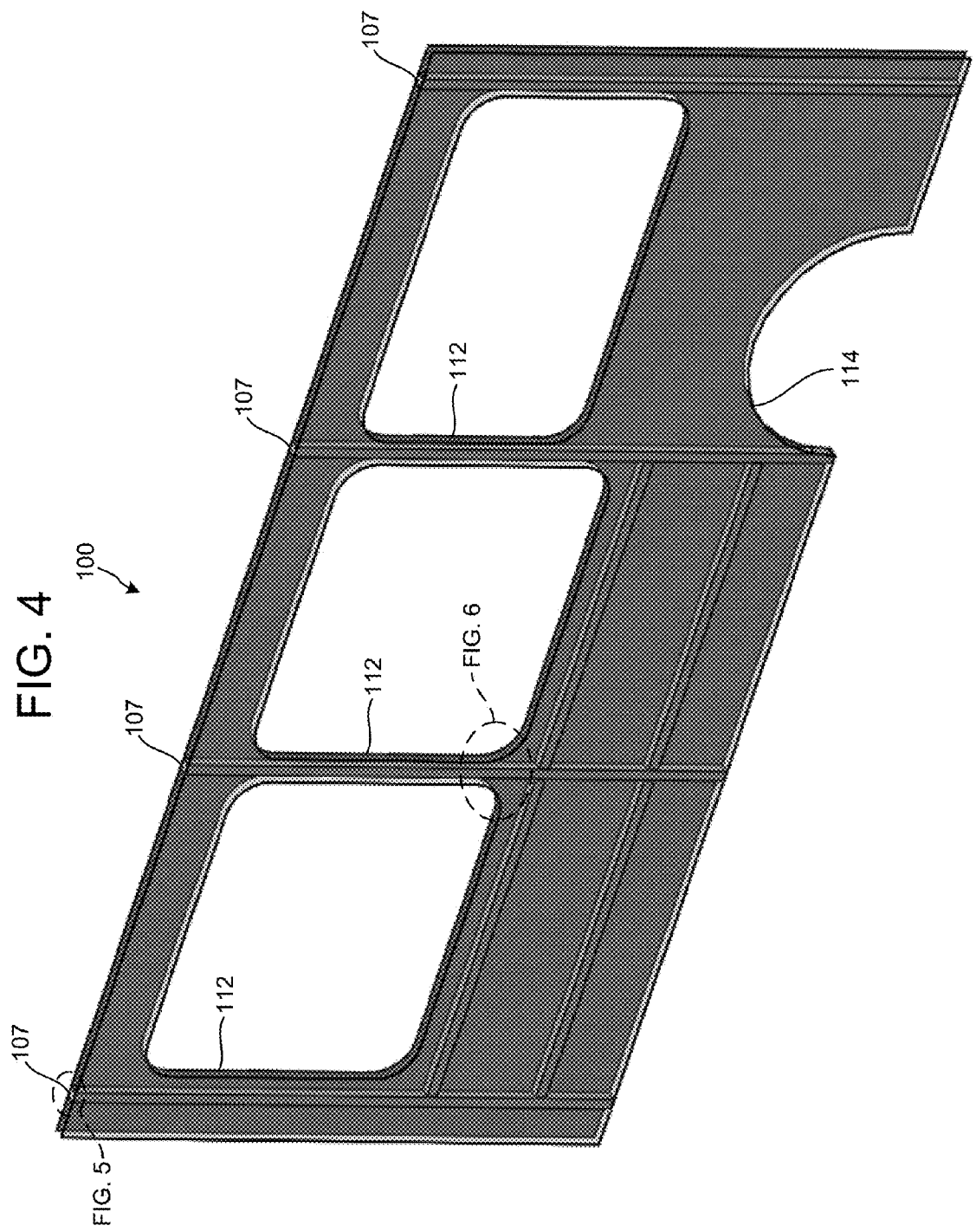

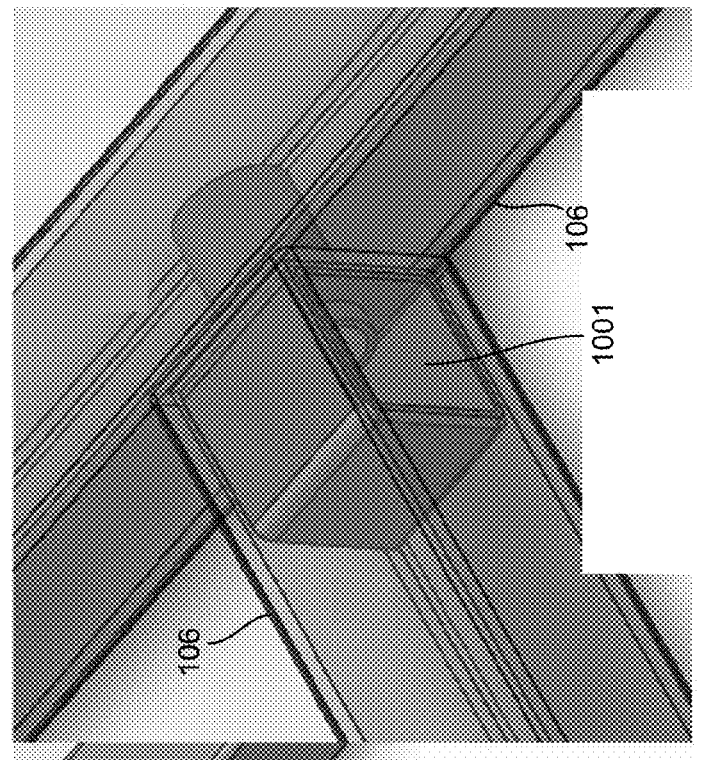
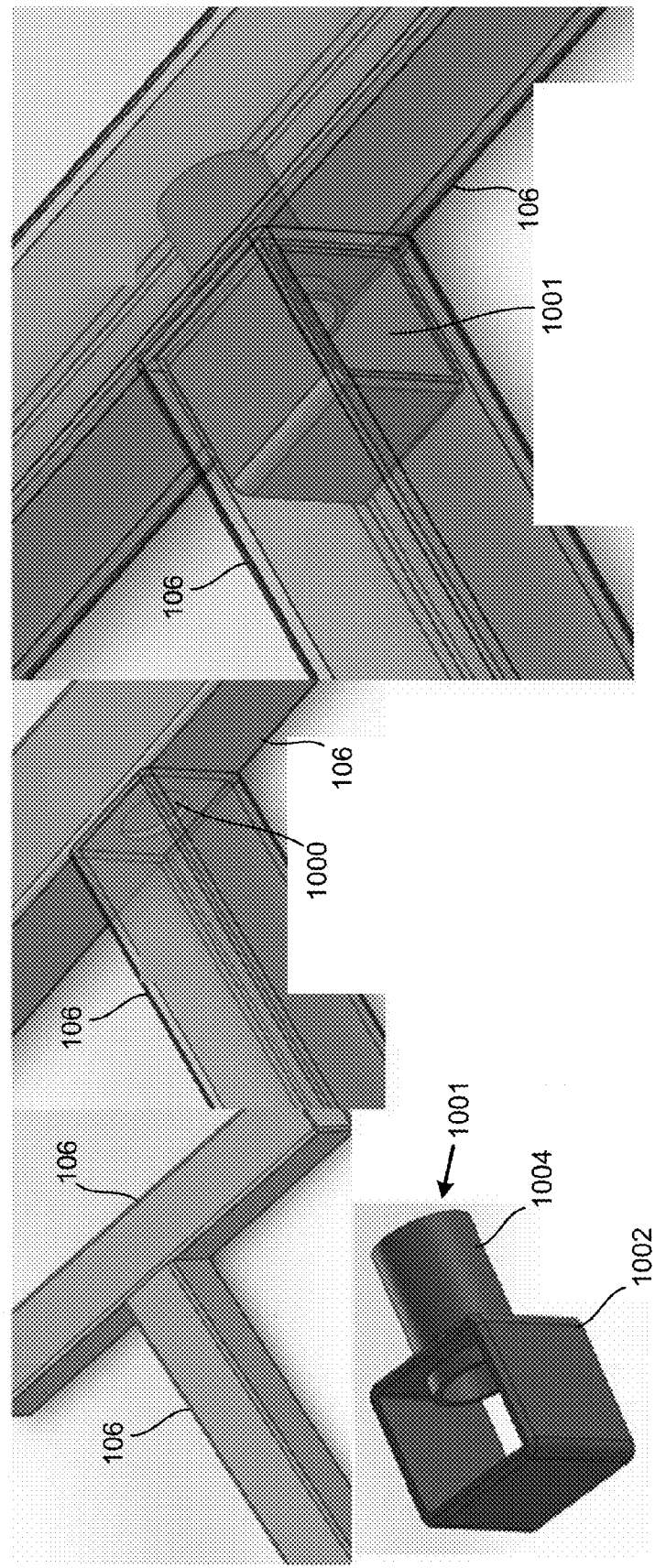
FIG. 10A  FIG. 10B  FIG. 10C  FIG. 10D

FIG. 12A
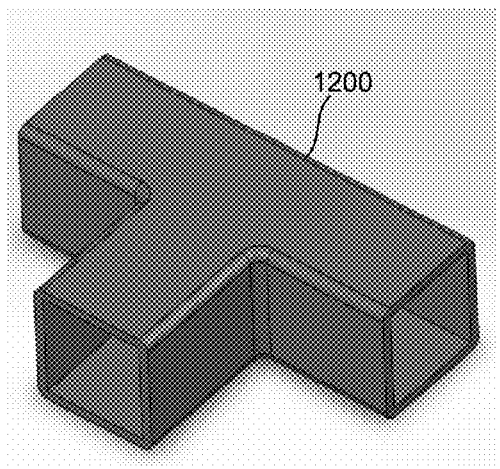
FIG.12B
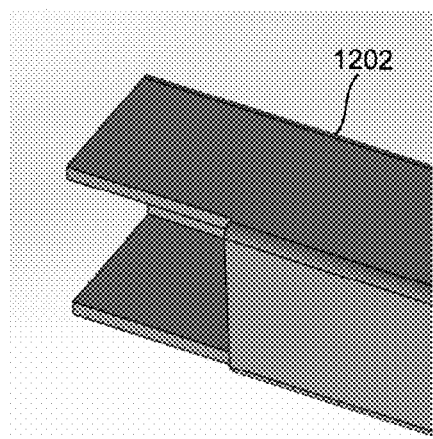
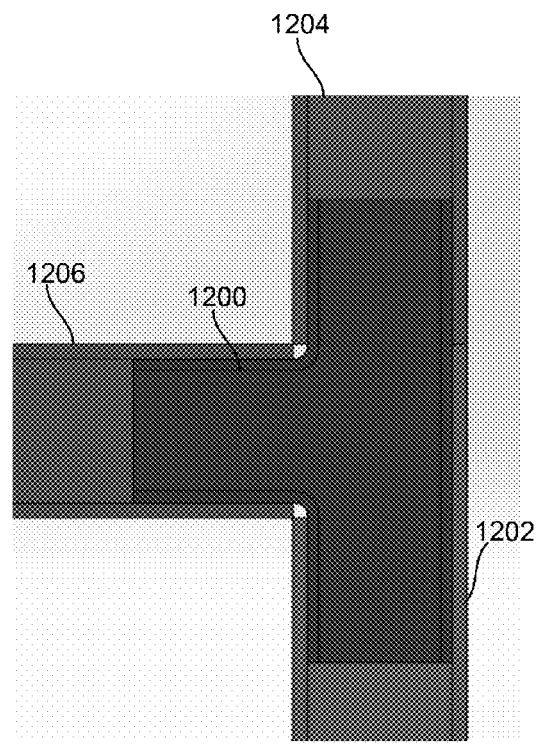
FIG. 12C

FIG. 12D
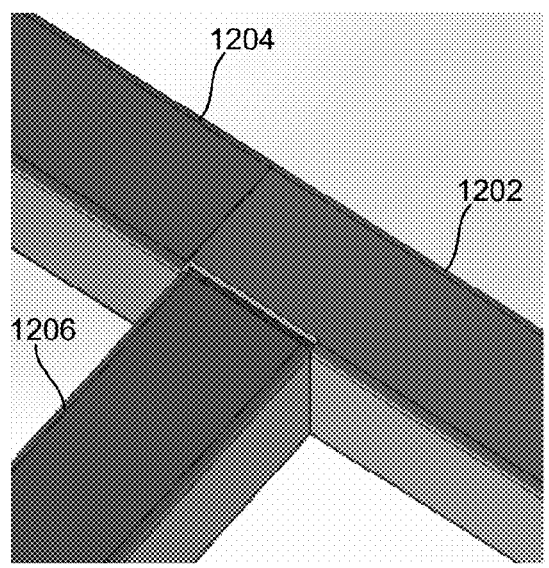
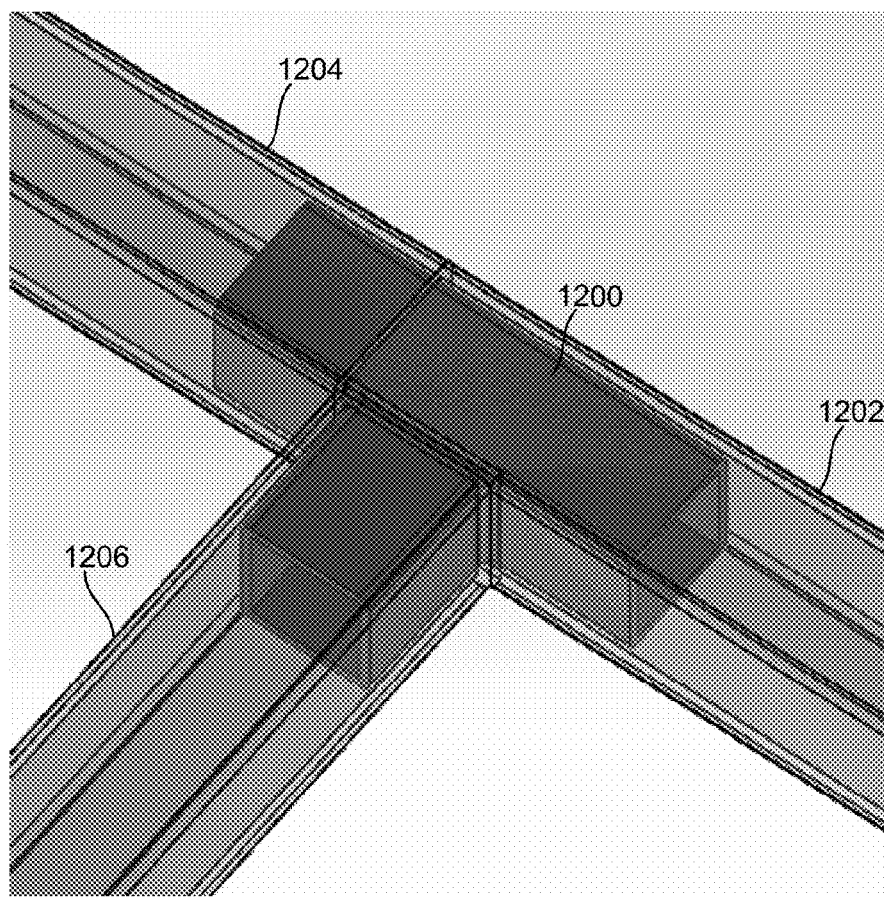
FIG. 12E

LIGHTWEIGHT MODULAR STRUCTURAL PANEL

FIELD

The present disclosure generally relates to panels, and more particularly, to an improved panel and methods of making the panel.

BACKGROUND

Typically, buses and other vehicles are constructed of a metal (such as steel) frame onto which aluminum or fiberglass panels are attached. This type of construction can cause assembled panels, such as may be configured into vehicles, to be heavy, creating issues with Gross Vehicle Weight (GVW) and fuel efficiency. This type of construction is also susceptible to deformation due to a crash, roll-over, or other accident, causing serious injury to passengers.

Sandwich type panel constructions have also been used in vehicles. One such type of sandwich panel construction is disclosed in, for example, U.S. Pat. No. 3,394,513, entitled Sandwich Panel Attachment Reinforcement, issued to M. E. Nerem. In known panels, a sandwich panel is composed of a sandwich panel core material such as polystyrene, paper, metal honeycomb, foamed polyurethane, plywood, or fibrous boards. A reinforcing member is typically bonded to the core material using a bonding material (such as an adhesive). A sandwich panel facing material (such as steel, aluminum, plywood, hardboard, or fiberglass-reinforced plastic) is then bonded to the core materials and the reinforcing member using a bonding material (such as an adhesive). Another sandwich panel facing material may also be bonded to the core materials on the opposite side as the sandwich panel facing material using a bonding material (such as an adhesive). A support member can then be secured using a fastener to an outside of the sandwich panel at the reinforcing member.

However, known sandwich type panel construction may not be adequate to provide sufficient structural support to a vehicle component. As such, these types of panels have typically been confined to non-passenger applications, such as trailers. Known sandwich panels, among other things, do not incorporate or have integrated structural components acting as a frame, for example for bearing weight, spreading impact forces or providing structural integrity. Known sandwich panel constructions are, among other things, susceptible to deformation and breakage due to impact such as a crash, roll-over, or other accident and can result in serious injury to passengers due to deformation or breaking on impact.

Although frames are known, these frames typically involve solid bars or beams welded together to form the frame. Welded frames add complexity to the manufacturing of the panels and results in added weight to the vehicle, which creates issues with Gross Vehicle Weight as well as fuel economy of the vehicle.

SUMMARY

In general, the present disclosure relates to an assembly and method for constructing a structural panel including one or more box beams disposed between first and second outer sheets. The box beams are located at selected locations to provide structural support. The assembled sandwich panel according to the disclosure has the box beams configured as integrated structural components acting as a frame for bearing weight, optionally affixing components (e.g., seat frames), and spreading impact forces and/or providing structural integrity, without the need for welding or like coupling of the box beams. The lack of metal construction and welding keeps the Gross Vehicle Weight to a minimum and also assists in the fuel economy of the vehicle. To address weight and strength considerations the box beams are a pultruded combination of fiberglass reinforcements and thermosetting polyester or vinyl ester resin systems (referred to herein as "pultrusions"). In essence, the pultrusion process is the process of pulling fiberglass reinforcements through a bath of thermosetting resin and into a heated forming-and-curing die to produce composite structural shapes.

A core or filler material may also be disposed between the first and second outer sheets at selected locations. For example, the core material may be disposed between the first and second outer sheets and fill in the space between the box beams. In another example, the core material may include channels or recesses and the box beams may be positioned in the channels or recesses in the core material.

The modular panel may be assembled using a pultrusion process. Glass fibers or the like are pulled through a resin bath to form outer sheets that are moved through a "preformer" used in forming the panel. As the outer sheets enter the preformer, one or more box beams and core material are selectively placed between the outer sheets. This layered structure is pressed together and heated within a die to form the modular panel. After the modular panel is formed, the exterior of the panel is finished/laminated, and thereafter holes are cut through the panel for windows and/or wheel well(s).

Alternatively, the modular panel may be assembled using pressure and/or heat. An outer sheet is disposed upon a lower press and a bonding agent resin is layered upon a surface of the outer sheet. One or more pultruded beams or pultrusions and core material are placed on the resin coated surface of the outer sheet and further bonding agent resin is placed upon exposed surfaces of the pultrusion(s) and core material. A second outer sheet is placed on the resin coated surfaces of the pultrusion(s) and core material. An upper press then contacts the second outer sheet and the lower and upper presses apply pressure on the layered materials until a modular panel according to the present disclosure is achieved. Moreover, the presses may apply heat to the layered materials to facilitate the curing process.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which:

FIG. 4 illustrates a perspective view of the cut panel according to embodiments of the disclosure with structural pultrusions shown in phantom;

FIG. 10A illustrates orthogonal pultrusions according to embodiments of the disclosure;

FIG. 10B illustrates orthogonal pultrusions with one of the pultrusions having a hole cut therethrough according to embodiments of the disclosure;

FIG. 10C illustrates an insert for coupling orthogonal pultrusions according to embodiments of the disclosure;

FIG. 10D illustrates orthogonal pultrusions coupled using the insert of FIG. 10C according to embodiments of the disclosure;

FIG. 12A illustrates a tee-bracket for coupling pultrusions according to embodiments of the disclosure;

FIG. 12B illustrates a pultrusion having a portion removed from an end thereof for coupling pultrusions using the tee-bracket of FIG. 12A according to embodiments of the disclosure;

FIG. 12C illustrates pultrusions coupled using the tee-bracket of FIG. 12A according to embodiments of the disclosure;

FIG. 12D illustrates pultrusions coupled using the tee-bracket of FIG. 12A according to embodiments of the disclosure; and FIG. 12E illustrates pultrusions coupled using the tee-bracket of FIG. 12A according to embodiments of the disclosure.

DETAILED DESCRIPTION

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

In general, the present disclosure relates to a structural panel and a method of construction including one or more box beams disposed between first and second outer sheets at locations selected to address weight and structural consideration. The box beams are a pultruded combination of fiberglass reinforcements and thermosetting polyester or vinyl ester resin systems, such as those sold under the trade name EXTREN® by Strongwell Corporation. In essence, pultrusion is the process of pulling fiberglass reinforcements through a bath of thermosetting resin and into a heated forming-and-curing die to produce composite structural shapes.

In order to limit the weight of structural panels according to the disclosure, while at the same time providing a structural panel that addresses required impact and strength considerations, the pultruded box beams are disposed in parallel locations in relation to one another. The pultruded box beams may form a frame with orthogonally disposed box beams that may be coupled using any of several coupling mechanisms, including epoxy/resin, brackets, friction fit inserts, tee-brackets or the like.

A core or filler material may also be disposed between the first and second outer sheets at selected locations. For example, the core material may be disposed between the first and second outer sheets and fill in the space between the box beams. In another example, the core material may include channels or recesses and the box beams may be positioned in the channels or recesses in the core material. The assembled sandwich panel according to the disclosure has the box beams configured as integrated structural components with the core or filler material disposed between the first and second outer sheets, the pultrusion box beams disposed at selected locations acting as a frame for bearing weight, spreading impact forces and/or providing structural integrity to the panel.

Figure 1:
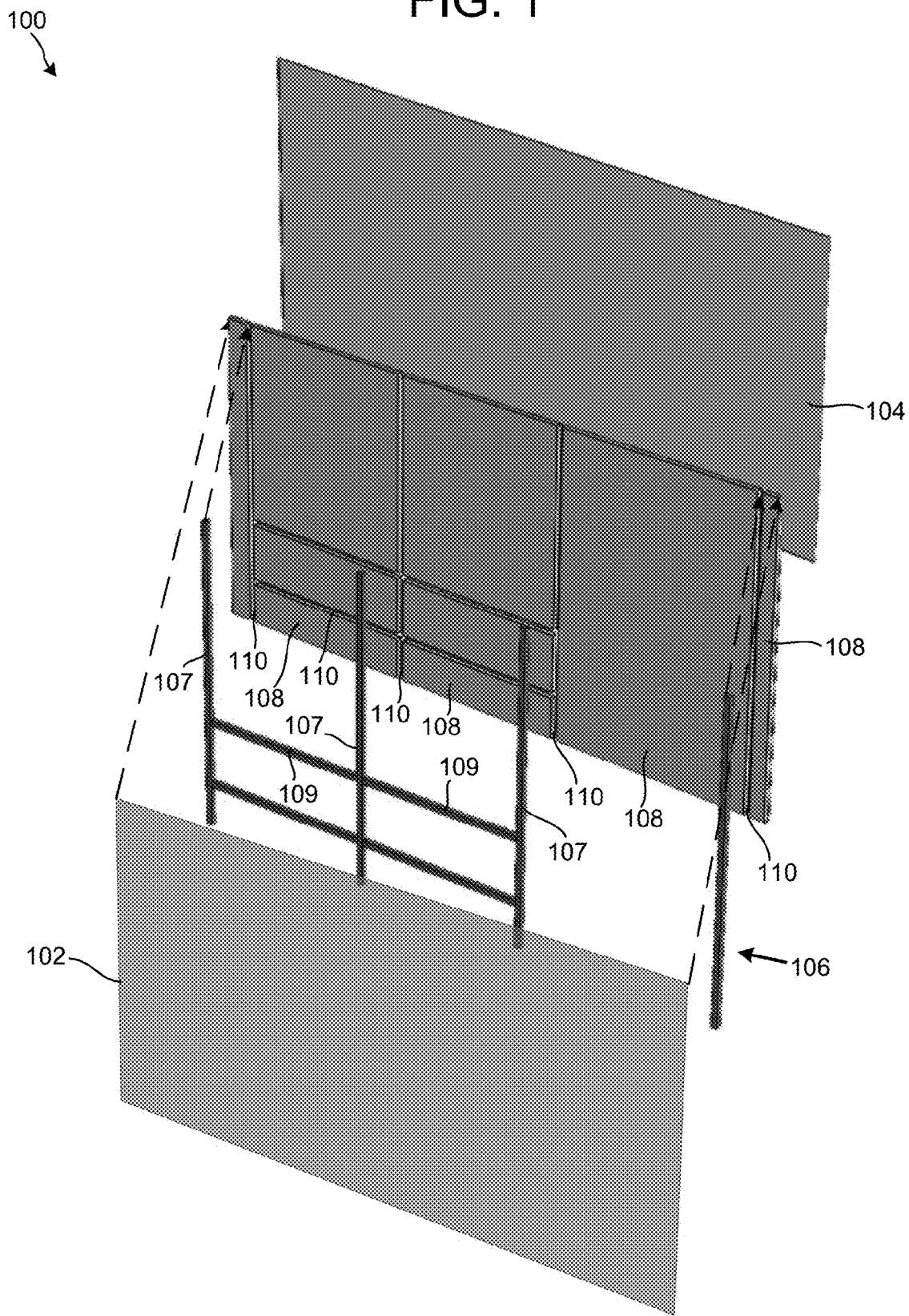
FIG. 1 illustrates an exploded view of a panel according to embodiments of the disclosure.
Figure 2:
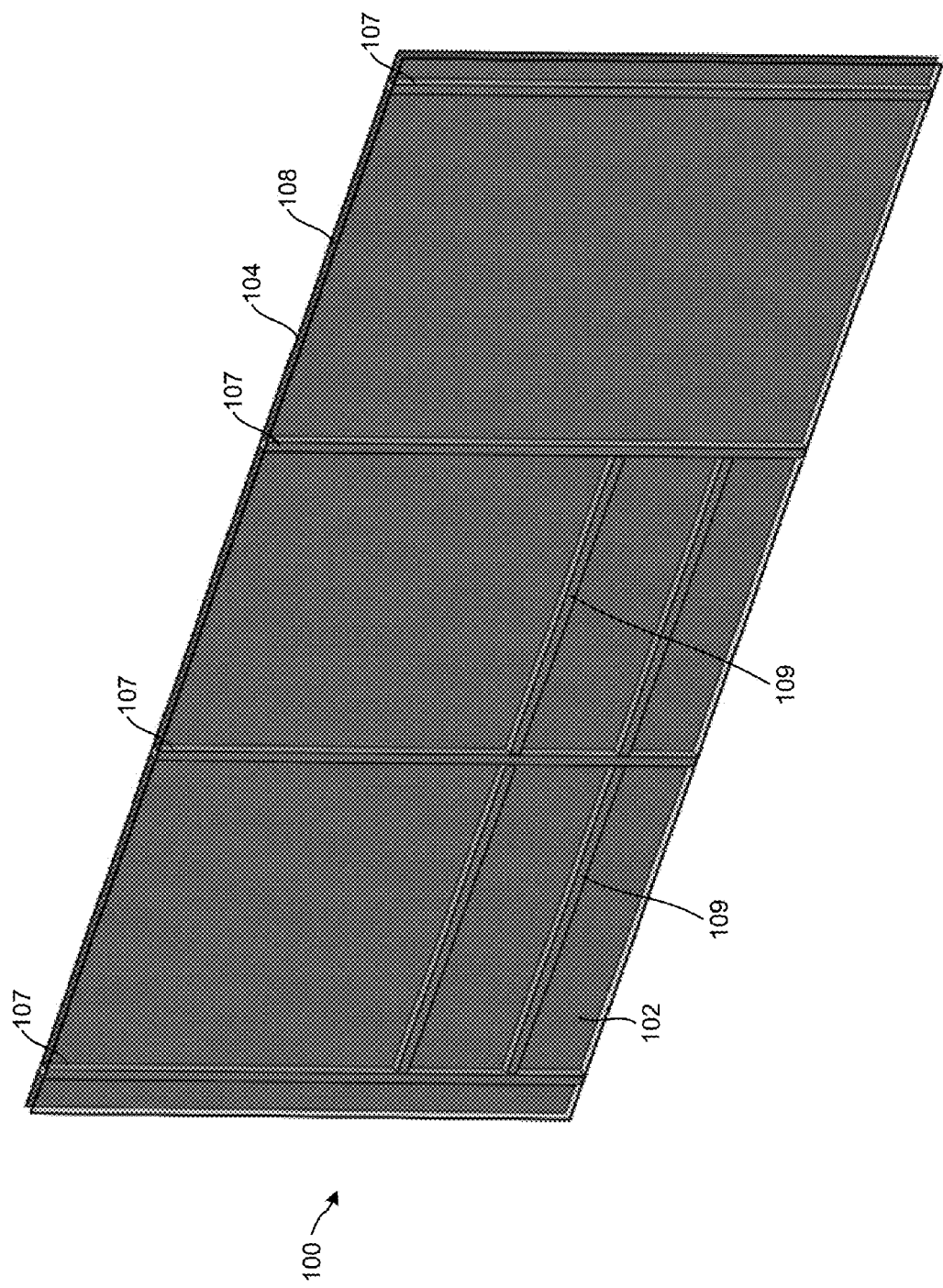
FIG. 2 illustrates a perspective view of the panel according to embodiments of the disclosure with structural pultrusions shown in phantom.

A panel 100 according to the present disclosure is described with reference to FIGS. 1 and 2. The panel 100 includes a first outer sheet 102, a second outer sheet 104, one or more pultruded box beams or "pultrusions" 106 disposed between the first outer sheet 102 and the second outer sheet 104, and one or more core material portions 108 disposed between the first outer sheet 102 and the second outer sheet 104. In an illustrative embodiment as described herein the panel 100 may be a modular panel configured for use in a paratransit passenger bus. Accordingly, the panel 100 may be about 169 inches by about 81 inches, for example.

The first and second outer sheets 102, 104 may be monolithically formed as single pieces, and act as a type of skin of the panel. For example, the first and second outer sheets 102, 104 may be fiber reinforced plastic or fiber reinforced polymer (FRP). The outer sheets 102 and 104 may also be coated, embossed, laminated or otherwise provide decorative appeal to the panel 100.

The one or more pultruded box beams 106 may be disposed in selected locations between the first and second outer sheets 102, 104 to provide the necessary weight, strength and structural aspects to the panel 100. As illustrated in FIG. 1, the panel 100 is designed to be used as a side panel for a vehicle, such as, a bus or paratransit bus so the pultruded box beams are optimally sized for strength and structural weight considerations. For example the pultrusions could be square or rectangular, or the like, and dimensioned to be from about 1 to 3 inches by about 1 to 3 inches formed as square or rectangular beams to provide desired strength and weight characteristics or by for the illustrative paratransit bus side panel embodiment. Preferably, the pultrusions may be 1.5 inch by 1.5 inch square beams. In this example, the one or more box beams 106 include four substantially vertical portions 107 and two substantially horizontal portions 109. The four substantially vertical portions 107 are spaced apart from one another along a horizontal length of the panel 100 at a distance in a range of approximately 30 to 55 inches, or otherwise spaced for window placement and to maintain structural integrity.

Similarly, the two horizontal sections 109 of the pultruded box beams are optimally sized for strength and structural weight considerations. The horizontal pultrusions 109 are positioned below a center line 111 of the panel 100 at a distance between each pultrusion in a range of approximately 30 to 55 inches. This allows for windows and other features of a side of the vehicle to be formed utilizing the load carrying characteristics of the integrated frame and modular panel without the weight and complexity of welded metal framing.

The core material 108 may fill the space between the first and second outer sheets 102, 104, as well as between the various pultruded box beams 106. The core material 108 may be a fluid, a foam, or other lightweight, durable material, such as high-density and closed-cell foam. In an example, when the core material 108 is a solid type material, the core material 108 may include one or more portions disposed between the horizontal and vertically disposed pultruded box beams 106. In another example, when the core material 108 is a solid type material, the core material 108 may include recesses or channels 110 formed therein. In this example, the box beams 106 are disposed in the channels 110.

In one example, the panel 100 may be formed by coupling the first outer sheet 102 to a first side of the box beams 106 and coupling the second outer sheet 104 to a second side, opposite the first side, of the box beams 106. The core material 108 may then be injected between the first and second outer sheets 102, 104 and the box beams 106. In another example, the panel 100 may be formed by positioning the box beams 106 in channels 110 and coupling the box beams to the core material 108. The first outer sheet 102 is then coupled to a first side of the box beams 106 and core material 108 and the second outer sheet 104 is then coupled to a second side, opposite the first side, of the box beams 106 and core material 108.

In yet another example, the panel 100 may be formed by positioning the box beams 106 between sheets or portions of the core material 108 and coupling the box beams to the core material 108. The first outer sheet 102 is then coupled to a first side of the box beams 106 and core material 108 and the second outer sheet 104 is then coupled to a second side, opposite the first side, of the box beams 106 and core material 108, as described in greater detail hereinafter.

The various elements (the first outer sheet 102, the second outer sheet, the box beams 106 comprising the frame, and the core material 108) may be coupled together via bonding to construct a panel with an integrated structural frame. This may include bonding using one or more bonding agents, such as, adhesives, resins, etc.

Figure 3:
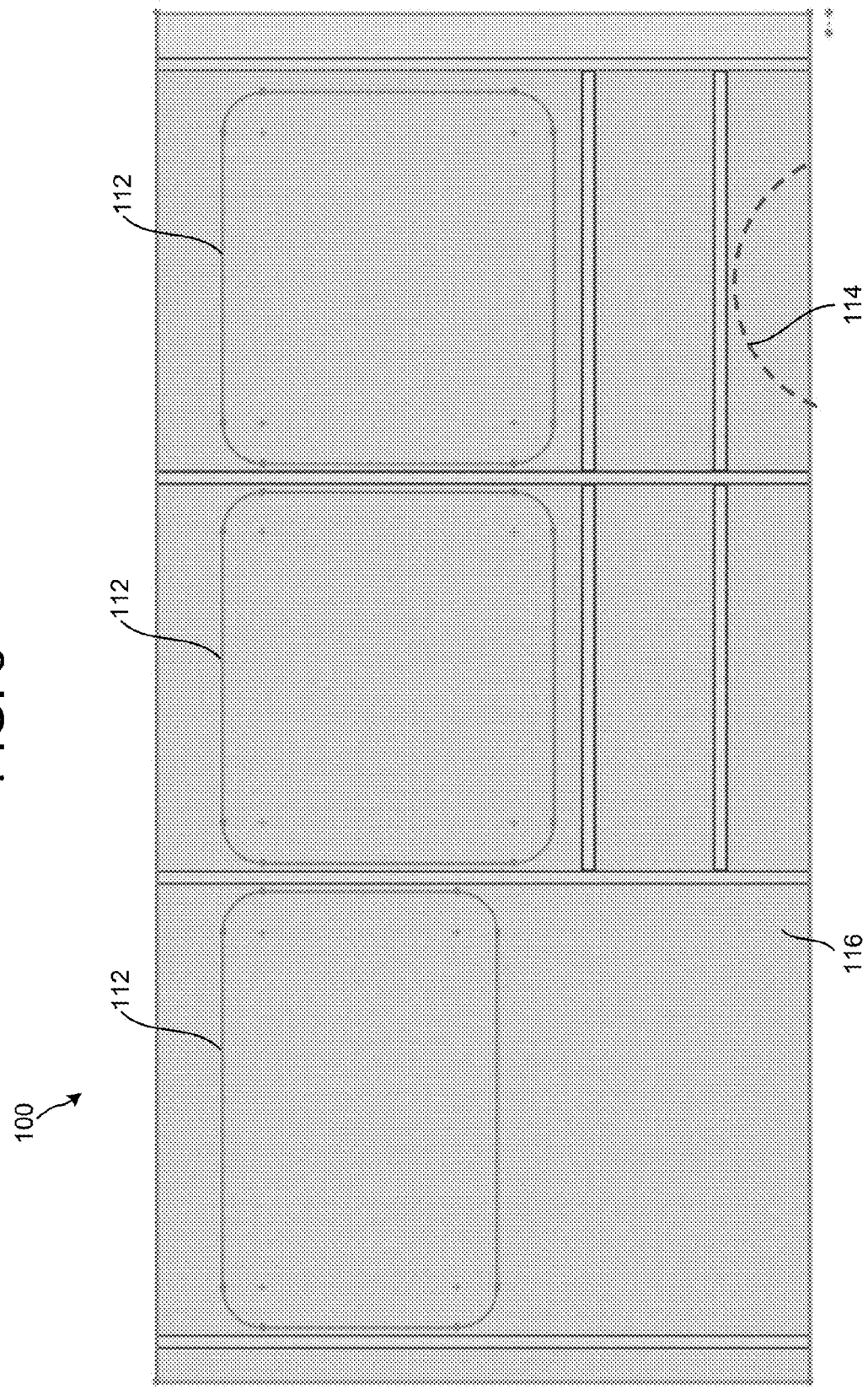
FIG. 3 illustrates a side view of the panel incorporating cutting lines according to embodiments of the disclosure with structural pultrusions shown in phantom.
Figure 5:
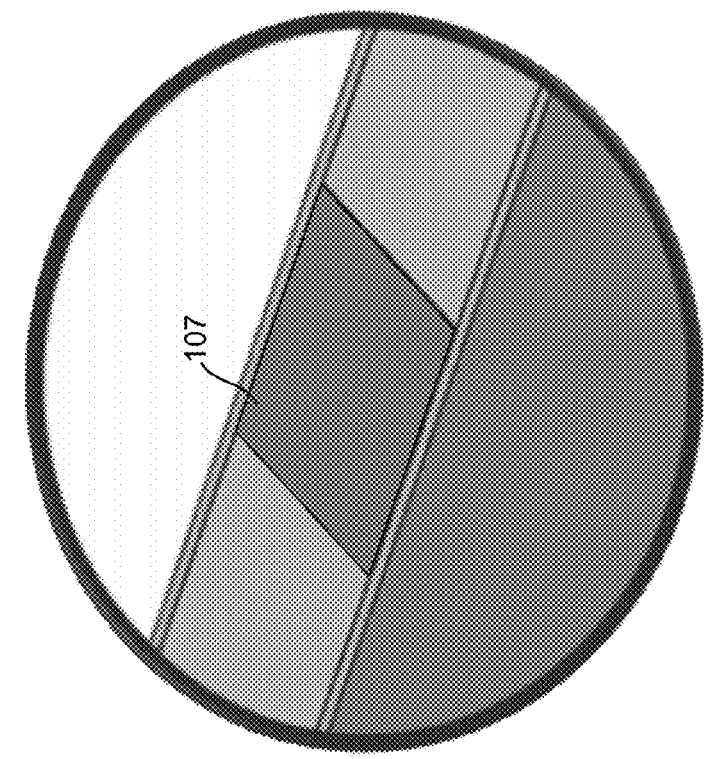
FIG. 5 illustrates an enlarged view of a first portion of the cut panel of FIG. 4 according to embodiments of the disclosure.

As mentioned above, the panel 100 illustrated in FIGS. 1 and 2 is designed to be used as a lightweight structural side panel with an integrated frame for a vehicle, such as, a bus or paratransit bus. For example, in FIG. 3, a paratransit bus side panel with integrated structural frame is illustrated having outlines of one or more windows 112, wheel wells, 114, and features to be cut out after the modular panel is assembled as described hereinafter. The one or more windows 112, wheel wells, 114, and a perimeter of the side panel 116 may then be cut resulting in panel 100 illustrated in FIG. 4 having a fully integrated structural frame comprised of vertical and horizontal box beam pultrusions as described herein before. In this example, the windows 112 are located between the four vertically oriented box beams 106 and vertically above the horizontally positioned box beams 106, as illustrated in FIG. 5. This allows the side panel of the vehicle to be constructed as a modular panel with integrated structural components without compromising the structure of the vehicle. However, it should be appreciated, that box beams 106 may be oriented in any or various directions and spacings to accommodate other features of a side panel of a vehicle or modular application to be formed with fully integrated structural components comprising the box beams 107,109.

Figure 6:
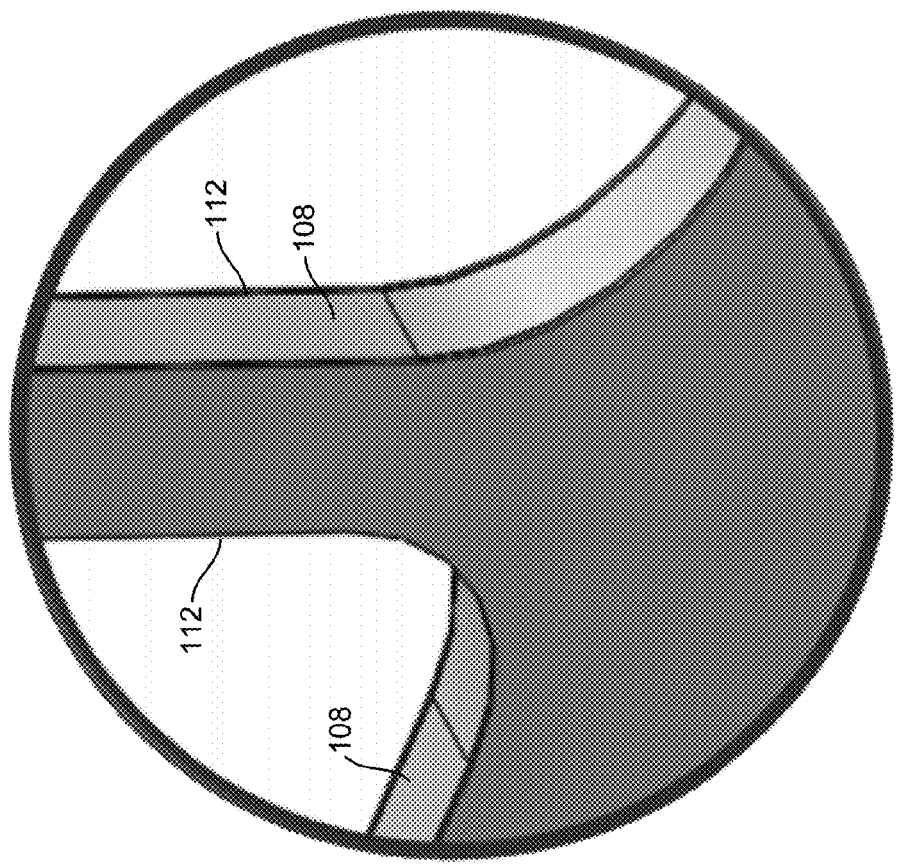
FIG. 6 illustrates an enlarged view of a second portion of the cut panel of FIG. 4 according to embodiments of the disclosure.

Referring to FIGS. 5 and 6, the box beams 106 provide for increased strength as well as a lighter side wall of a vehicle than that of any conventional vehicle side wall construction. As illustrated in FIG. 6, the modular panel 100 also allows for a greater radius in the windows 112 than that of conventional vehicle side wall construction. This greater radius in the window 112 provides increased strength at window connections.

Figure 7:
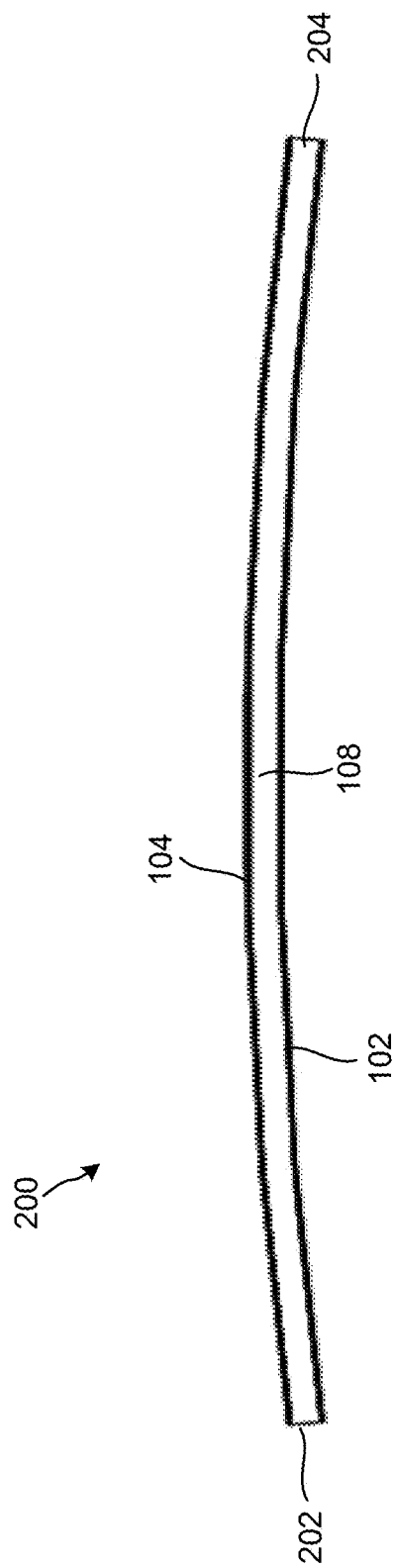
FIG. 7 illustrates a side view of a curved panel according to embodiments of the disclosure.

In another embodiment, similar panels may be constructed for use in other parts of a modularly constructed lightweight, high-strength vehicle. For example, referring to FIG. 7, a panel 200 may be constructed for a roof of a vehicle. In this example, the panel 200 may include the first outer sheet 102, a second outer sheet 104, and the core material 108 disposed between the first outer sheet 102 and the second outer sheet 104. The panel 200 may also be curved to form a contour of the roof.

One or more box beams 106 may also be disposed between the first outer sheet 102 and the second outer sheet 104 and extending from a first end 202 to a second end 204 of the panel 200 with exemplary dimensions as described for the modular side panels as described. This may provide added strength to the roof panel 200 and add significant strength and protection in the event of a rollover. It should be appreciated by those skilled in the art that other roof panel constructions can be implemented for integration with a modular side panel according to the disclosure.

Figure 8:
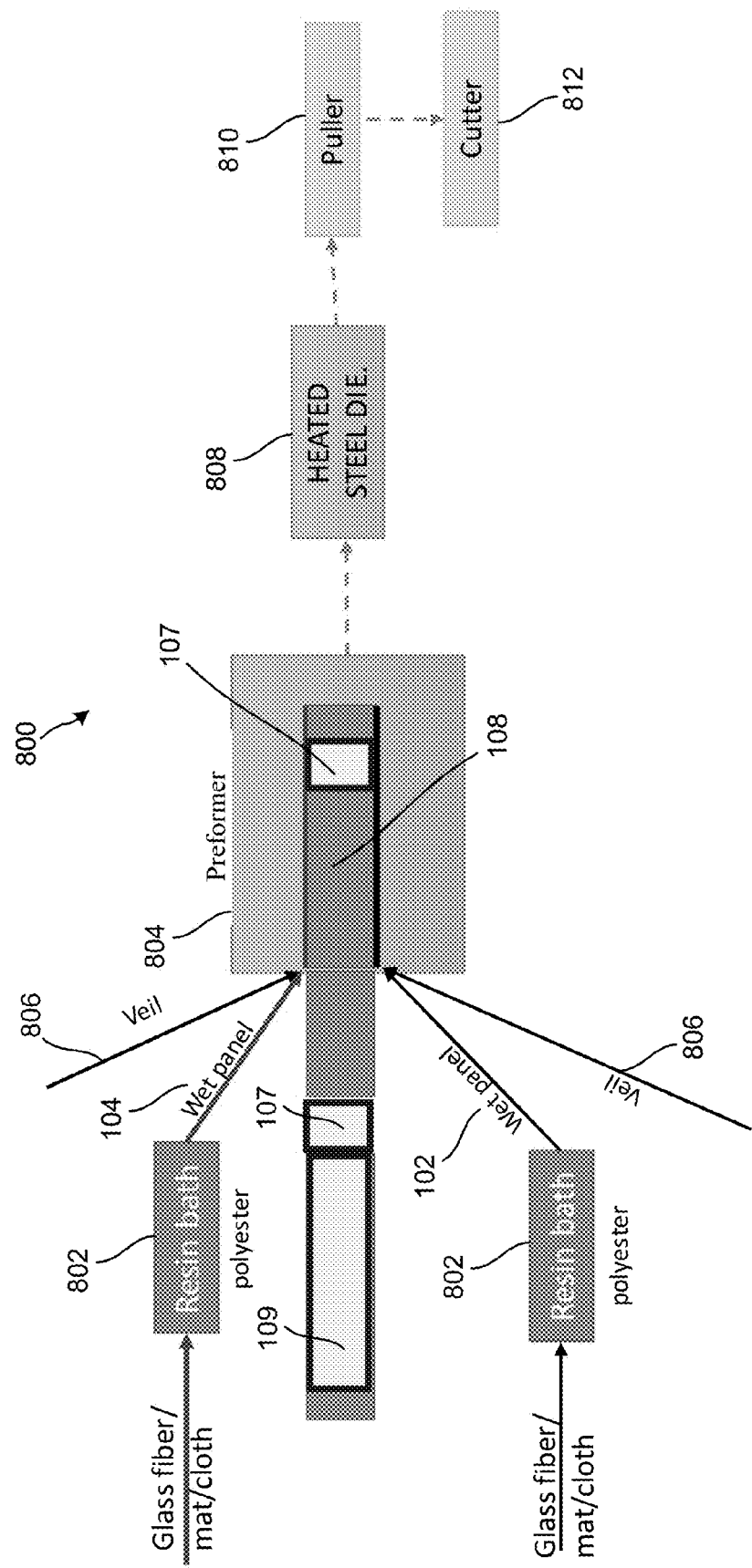
FIG. 8 illustrates a system for constructing a panel according to embodiments of the disclosure.

Referring to FIG. 8, a system 800 for forming the panels 100/200 is disclosed. The system 800 is configured to limit delamination of the elements of the panels 100/200. The outer sheets 102 and 104 are created by running glass fiber, mat, or cloth through a resin (e.g., polyester) bath 802. In an example, each outer sheet 102 and 104 may have a thickness of about 0.05 inches to about 0.15 inches. The wet outer sheets 102 and 104 containing resin are moved to separate walls of a performer 804. At the preformer, the beams 107 and 109 and the core material 108 are strategically placed at locations between the outer sheets 102 and 104. Veils 806 may be applied to the outer sheets 102 and 104 just before or while the wet outer sheets 102 and 104 enter the performer 804. The veils 806 are additional materials/layers added to the laminar structure during construction that provide additional characteristics, such as assist in the protection of the outer sheets 102 and 104 from wear, tear, and other degradation. As the outer sheets 102 and 104 are moved through the preformer, the preformer applies pressure to exterior sides of the outer sheets 102 and 104 to press the sheets 102 and 104 against the beams 107 and 109 and the core material 108, thereby producing a panel having a desired cross-section and size. The resulting pressed panel is moved to a heated steel die 808 that maintains the shape of the panel and cures the resin of the panel.

While the heated steel die 808 is illustrated as being separate from the performer 804, one skilled in the art should appreciate the heated steel die may be integrated within the preformer without departing from the scope of the present disclosure. The cured panel is pulled by a puller 810 from the heated steel die and sent to a cutter 812, where window holes and wheel wells may be cut into the panel. In an example, after the panel is cured but prior to the panel reaching the cutter, the outer surfaces of the panel may be laminated/finished (not shown). That is, a decorative interior/exterior surface material may be applied as a finish for a fully constructed modular panel. According to this example, cutting of the modular panel occurs after the panel is laminated/finished.

Figure 9:
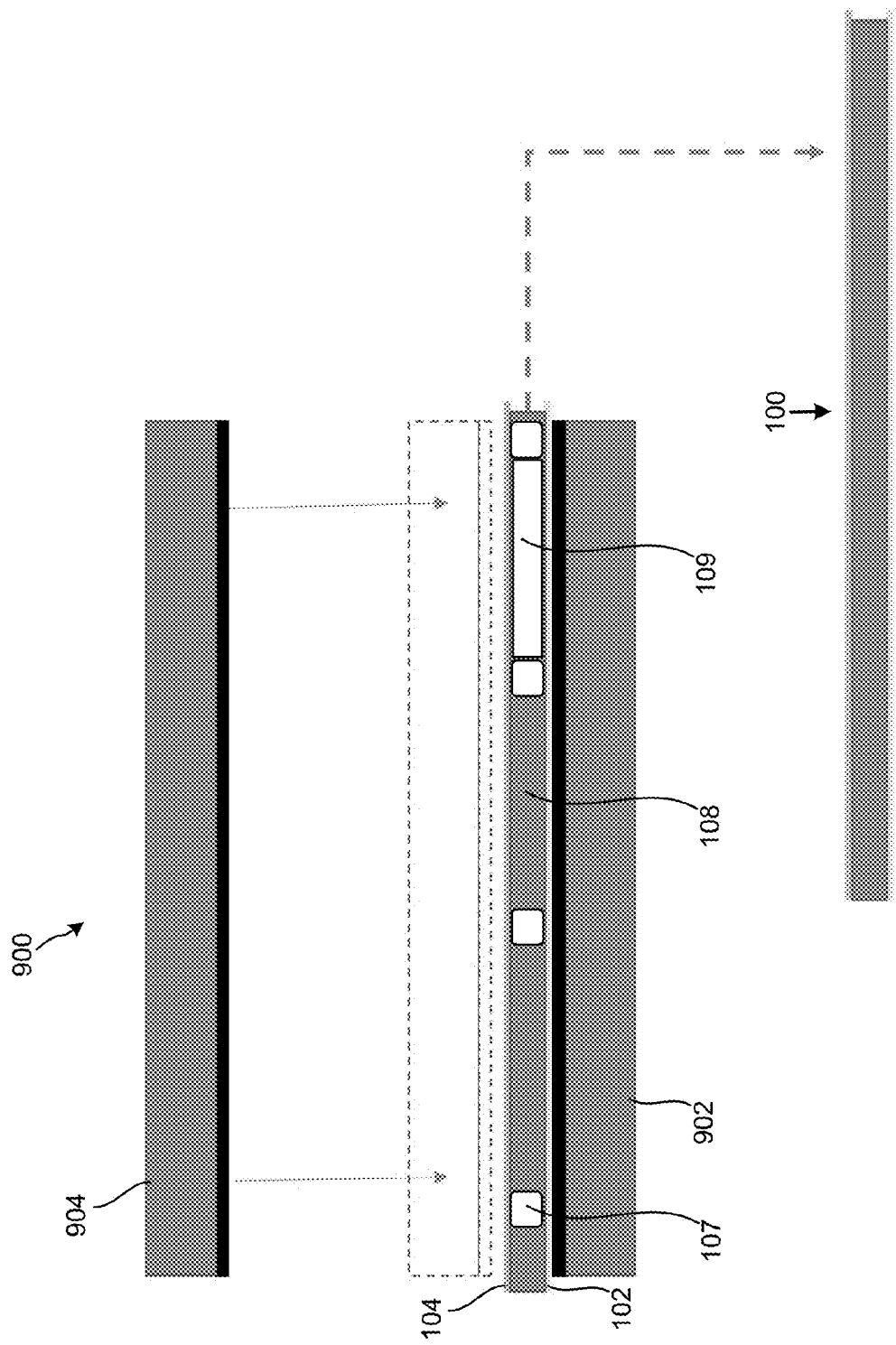
FIG. 9 illustrates an alternative system for constructing a panel according to embodiments of the disclosure.

FIG. 9 illustrates an alternative system 900 for forming the panels 100/200. An outer sheet 102 is disposed upon a lower press 902. A bonding agent such as resin, epoxy, or the like is disposed upon an upper surface of the outer sheet 102 (i.e., the surface not contacting the lower press 902). Pultrusions 107 and 109 and core material 108 are strategically placed upon the bonding agent covered surface of the outer sheet 102 in a manner that addresses weight and structural considerations. Bonding agent is placed upon exposed surfaces of the pultrusions 107 and 109 and core material 108. Another outer sheet 104 is disposed upon the bonding agent covered surfaces of the pultrusions 107 and 109 and core material 108. An upper press 904 is brought in contact with the outer sheet 104, and pressure is applied to the outer sheets 102 and 104 by the presses 902 and 904 until a panel 100 according to the present disclosure is obtained. Moreover, the presses 902 and 904 may introduce heat to the material interposed therebetween. Addition of heat allows for the curing process to be achieved more rapidly.

As described with reference to FIGS. 8 and 9, the panels according to the present disclosure may be formed with the box beams 107 and 109 being uncoupled or unattached to each other (i.e., they are attached by the resin of the outer sheets 102 and 104). However, in an alternative implementation the box beams 107 and 109 may be coupled prior to the box beams 107 and 109 being formed in a modular panel with the outer sheets 102 and 104.

FIGS. 10A through 10D illustrate a mechanism for coupling orthogonally disposed box beams 106 as illustrated in FIG. 10A. using an insert 1001. A hole 1000 (FIG. 10B) is cut into a side surface of one of the box beams (either the horizontal beam or the vertical beam). A base portion 1002 of the insert 1001 (illustrated in FIG. 10C) is frictionally fit within an end of a box beam. The insert 1001 may be made of a durable material such as steel, aluminum, or the like. In an example, the insert 1001 may be attached within the end of the box beam using a resin, epoxy, adhesive, or the like. An extension portion 1004 of the insert is mated to or inserted through the hole 1000 cut out of the orthogonal box beam. The extension portion 1004 of the insert inserted through the hole 1000 may be maintained in position using friction, or may be held in position using a bonding agent such as a resin, epoxy, adhesive, or the like.

Figure 11A:
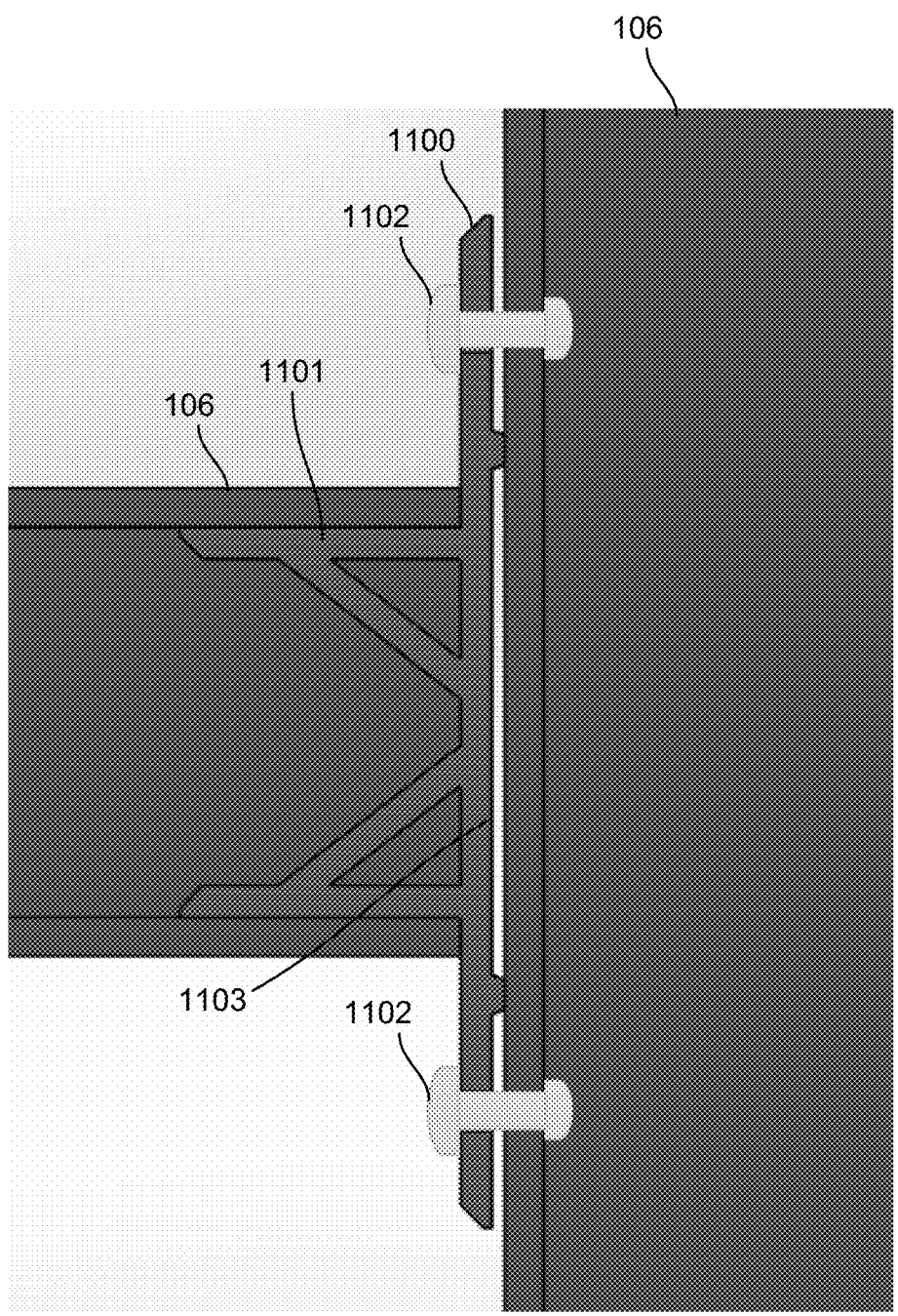
FIG. 11A illustrates a bracket for coupling orthogonal pultrusions coupled according to embodiments of the disclosure.
Figure 11B:
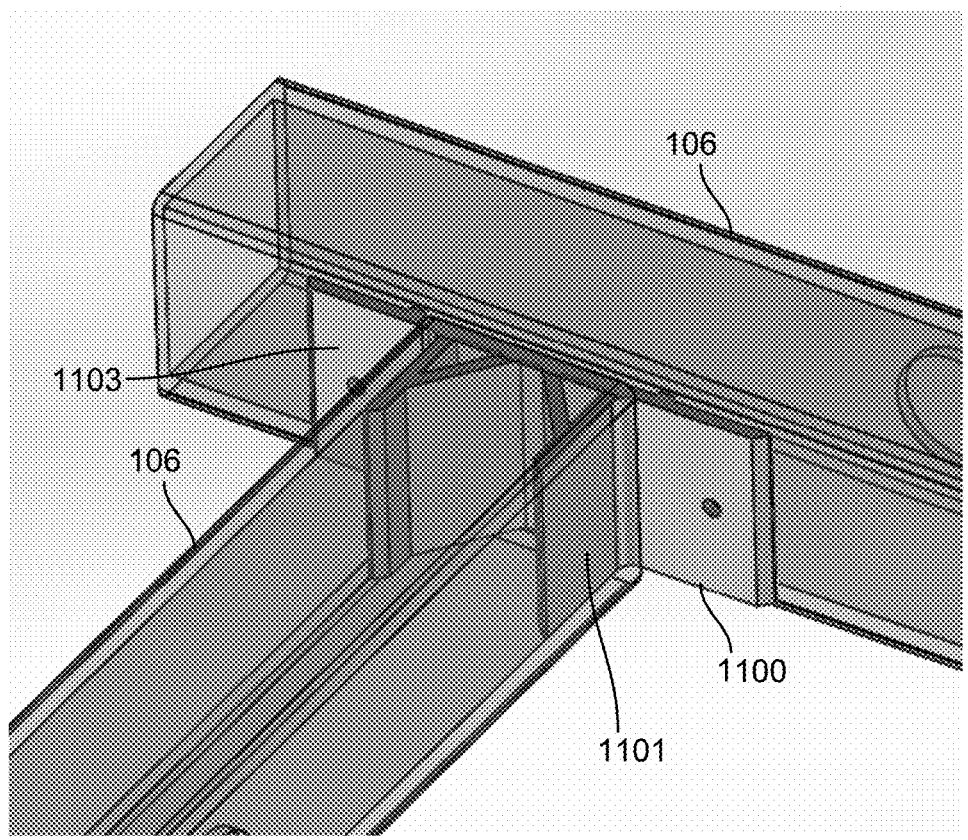
FIG. 11B illustrates orthogonal pultrusions coupled using the bracket of FIG. 11A according to embodiments of the disclosure.

FIGS. 11A and 11B illustrate an alternative mechanism for coupling orthogonal box beams 106 using a bracket 1100. An insert portion 1101 of the bracket 1100 is fit within an end of a box beam. Fitting of the insert portion of the bracket within the end of the box beam may occur frictionally, or through the use of a bonding agent such as epoxy, glue, and the like. The bracket 1100 also has an abutment surface 1103 that couples to a surface of a box beam orthogonal to the box beam that has the insert portion of the bracket inserted therein. Coupling of the bracket 1100 to the surface of the box beam may occur through the use of a bonding agent, such as glue or the like, and/or through the use of one or more fasteners 1102 such as rivets, machine screws, or the like, for example. Moreover, the abutment surface 1103 of the bracket 1100 that couples to the surface of the box beam may have one or more edges extending therefrom that increase the efficiency of coupling when using a bonding agent. The bracket 1100 may be a durable material such as aluminum, ABS, nylon or the like for example.

FIGS. 12A through 12E illustrate a further mechanism for coupling box beams 106 using a tee-bracket 1200 (illustrated in FIG. 12A). As illustrated in FIG. 12B, a portion of a surface at the end of a box beam 1202 is removed and a portion of the bracket 1200 is inserted into the end of the box beam 1202 until a surface of the bracket 1200 orthogonal to the portion of the bracket 1200 inserted into the box beam 1202 abuts a surface of the box beam 1202. This may result in the box beam 1202 housing more of the bracket 1200 than the other box beams 1204 and 1206 respectively. The other box beams 1204 and 1206 are then coupled to portions of the bracket 1200 not inserted into the box beam 1202. As illustrated, the box beams 1202, 1204, and 1206 are coupled to the bracket 1200 in a manner that results in the box beams 1202, 1204, and 1206 abutting each other. However, one skilled in the art should appreciate the box beams 1202, 1204, and 1206 being coupled to the bracket 1200 in a manner that does not result in the box beams 1202, 1204, and 1206 abutting. The box beams 1202, 1204, and 1206 may be frictionally coupled to the bracket 1200 and/or may be coupled to the bracket using a bonding agent. Moreover, if the box beams 1202, 1204, and 1206 are installed to abut, the box beams 1202, 1204, and 1206 may be coupled to one or more abutting box beam using a bonding agent, for example.

The outer sheets 102 and 104 may be one or more of fiber reinforced plastic or fiber reinforced polymer (FRP), an electrically-conductive polymer, gel coatings, resins, thermoplastic polyolefin (TPO), carbon fiber, aluminum (e.g., stainless), acrylonitrile butadiene styrene (ABS), etc. The outer sheets 102 and 104 may also be coated or provide decorative appeal to the panel 100.

The box beams 106 may be formed of a pultruded combination of fiberglass reinforcements and thermosetting polyester or vinyl ester resin systems, such as those sold under the name EXTREN® by Strongwell Corporation. The pultruded box beams 106 may provide corrosion resistance, low thermal conductance, low electrical conductance, electromagnetic transparency, light weight, high strength, fire resistance, and/or dimensional stability to the modular panel 100. The box beams 106 may also be formed of aluminum, steel, wood, acrylonitrile butadiene styrene (ABS), or a like durable material, for example.

While the positions of the box beams 106 in the panel 100 are described and illustrated in connection with a panel of a vehicle, the box beams 106 may be positioned in other locations to provide strength to other types of applications. For example, in the case of a solid wall, vertically oriented box beams 106 may be equally spaced along a length of the wall, and/or horizontally oriented box beams 106 may be equally spaced along a height of the wall. In some applications, the location and position of the box beams 106 are tailored to areas where additional components may be connected to and supported by the panel 100 or other structure formed in a similar manner as the panel 100.

Further, while the pultruded box beams 106 are described and illustrated as having a square or rectangular cross-sectional shape, the box beams 106 may have other cross-sectional shapes. For example, the box beams 106 may have triangular, trapezoidal, or other polygonal cross-sectional shapes that have appropriate strength and surface area.

The core material 108 may be a fluid, or other material. In one example, the core material 108 may be a light weight fill material, such as, foam sheets, polymer sheets, honeycomb polymer or metal, injectable foam or polymer. The core material 108 may be polyurethane, polystyrene or other light weight polymer in any form (foam, honeycomb, sheet, injectable, etc.), balsa wood, and other lightweight materials. The core material 108 may also be selected to provide certain properties. For example, the core material 108 may be selected to provide additional strength, corrosion resistance, thermal insulation, etc.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Moreover, it should be apparent to one skilled in the art, that the disclosure may be practiced without some or all of the specific details and steps disclosed herein.

The concepts disclosed herein may be applied within a number of different devices and systems, including, for example, vehicles, watercraft, residential construction, commercial construction, etc. The specification and drawings are, accordingly, to be regarded in an illustrative rather than a restrictive sense. It should, however, be evident that various modifications and changes may be made thereunto without departing from the broader spirit and scope of the disclosure as set forth in the claims.

What is claimed is:

1. A modular structural panel, comprising:
    a pultruded box beam having a first side and a second side forming an integrated structural frame of the modular structural panel, the pultruded box beam being a weight-bearing beam comprised of a combination of fiberglass and thermosetting resin;
    a first outer sheet coupled to the first side of the integrated structural frame;
    a second outer sheet coupled to the second side of the integrated structural frame; and
    a high-density foam interposed between the first outer sheet and the second outer sheet adjacent to the pultruded box beam.

2. The modular structural panel of claim 1, further comprising a non-high-density foam core material disposed between the first outer sheet and the second outer sheet and interspersed between beams of the integrated structural frame.

3. The modular structural panel of claim 1, wherein the pultruded box beam includes a plurality of pultruded box beams spaced apart from one another in a range of approximately 30 to 54 inches.

4. The panel of claim 3, further comprising a non-high-density foam core material disposed between the first outer sheet and the second outer sheet and between the plurality of pultruded box beams forming the integrated structural frame.

5. The panel of claim 3, wherein the plurality of pultruded box beams are oriented in substantially a vertical direction.

6. The panel of claim 3, wherein the plurality of pultruded box beams are oriented in substantially a horizontal direction.

7. The panel of claim 1, wherein the pultruded box beam includes a first pultruded box beam oriented in substantially a vertical direction and a second pultruded box beam oriented in substantially a horizontal direction to form the integrated structural frame of the modular structural panel.

8. A modular structural panel, comprising:
    a first outer sheet;
    at least one horizontal pultrusion coupled to the first outer sheet;
    at least one vertical pultrusion coupled to the first outer sheet, the at least one horizontal pultrusion and the at least one vertical pultrusion forming an integrated structural frame of the modular structural panel;
    a core material coupled to the first outer sheet, the core material adjacent the at least one horizontal pultrusion and the at least one vertical pultrusion, the at least one horizontal pultrusion and the at least one vertical pultrusion each being a weight-bearing structure comprised of a combination of fiberglass and thermosetting resin; and
    a second outer sheet coupled to surfaces of the at least one horizontal pultrusion, the at least one vertical pultrusion, and the core material distal from the first outer sheet.

9. The panel of claim 8, wherein the at least one horizontal pultrusion abuts the at least one vertical pultrusion.

10. The panel of claim 8, wherein coupling occurs through the use of a bonding agent.

11. The panel of claim 8, wherein the core material is a high-density foam.

12. The panel of claim 11, wherein the high-density foam is closed-celled.

13. The panel of claim 8, wherein the first and second outer sheets are laminated after being coupled to the at least one horizontal pultrusion, the at least one vertical pultrusion, and the core material.

14. The panel of claim 13, wherein the first and second outer sheets have corresponding apertures cut therethrough after the first and second outer sheets are laminated.

15. The panel of claim 8, wherein coupling occurs through curing of a bonding agent via heat.

16. The panel of claim 8, wherein the first and second outer sheets have edges with lengths of about 169 inches and about 81 inches.

17. The panel of claim 8, wherein the at least one horizontal pultrusion and the at least one vertical protrusion have square cross-sections.

18. A modular structured panel, comprising:
    a first outer sheet and a second outer sheet corresponding with the first outer sheet;
    a plurality of pultrusions interposed between the first and second outer sheets, the plurality of pultrusions including first pultrusions oriented in a first direction and second pultrusions oriented orthogonally with respect to the first pultrusions, the first and second pultrusions being bonded to the first and second outer sheets and forming an integrated structural frame of the modular structural panel, each pultrusion of the plurality of pultrusions being a weight-bearing structure comprised of a combination of fiberglass and thermosetting resin; and
    a core material interposed between the first and second outer sheets and adjacent to the first and second pultrusions; the core material being bonded to the first and second outer sheets and first and second pultrusions.

19. The panel of claim 18, wherein the pultrusions have rectangular cross-sections.

20. The panel of claim 18, wherein the first and second pultrusions are coupled using mechanical couplings.

* * * * *